March 3, 1970          R. G. PEARCE          3,499,103
STRAIN RELIEF DEVICE
Filed June 1, 1967
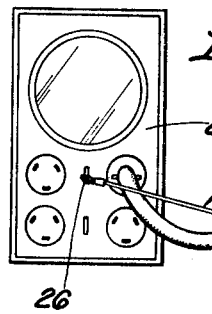
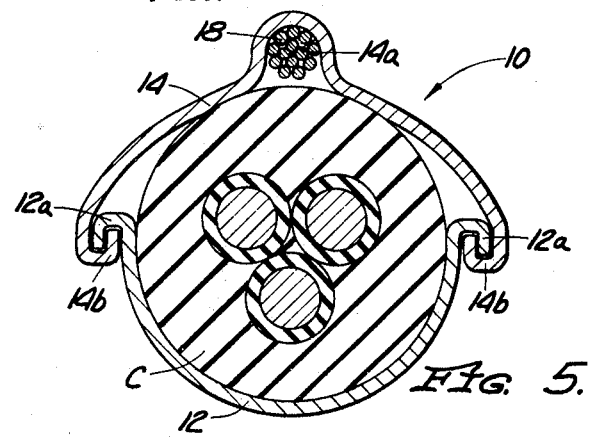
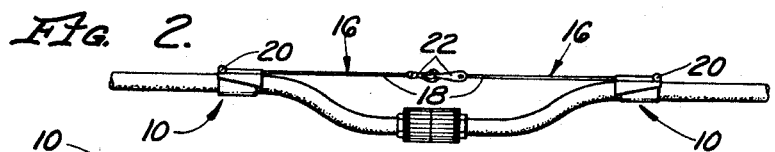
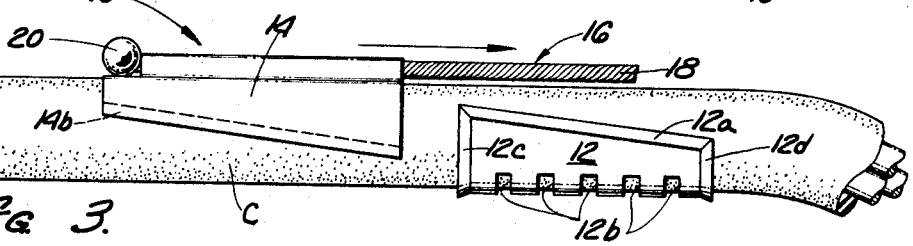
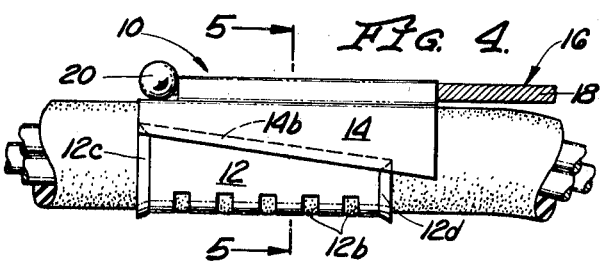
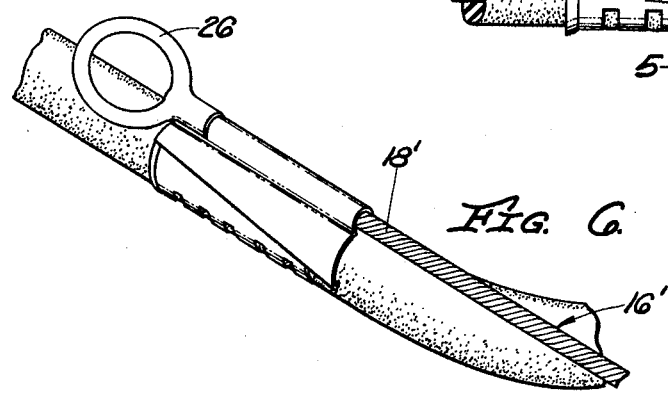
INVENTOR
ROGER G. PEARCE
BY John H. Crowe
AGENT _United States Patent Office_

3,499,103
Patented Mar. 3, 1970

3,499,103
STRAIN RELIEF DEVICE
Roger G. Pearce, Dallas, Tex., assignor of ten percent to
Carol L. Oden, Fontana, Calif.
Filed June 1, 1967, Ser. No. 642,920
Int. Cl. H01b 7/28
U.S. Cl. 174—135        5 Claims

ABSTRACT OF THE DISCLOSURE

A strain relief device comprising a pair of semicylindrical clamp members with slanting, beaded side edges which slide into engagement to lock the members around an electrical conductor cord, and a pull cable associable with one of the clamp members which has a hook on one end by means of which it can be made fast to an anchor point. The parts of the strain relief device are so arranged that the anchored cable can hold the clamp members in tight engagement when they are positioned for use on a conductor cord.

BACKGROUND OF THE INVENTION

This invention relates to means for relieving pulling tension, or strain, on electrical conductor cord fitting connections such as those between electrical appliance cords or between such cords and wall outlets or receptacles.

It is well known that conductor cords for electrical appliances are commonly subjected to pulling strains of one sort or another in service. These strains tend to pull cord fitting connections loose and, worse still, to loosen the connections between individual conductor wires and their terminals within conductor fittings. Such accidental loosening of conductor fittings can lead to costly work stoppages, particularly in the case of companies which employ power tools in large numbers, have extensive assembly line operations, or both, such as, for example, companies engaged in the automotive, aircraft, construction, ship building, radio and/or television broadcasting, movie production, etc., industries; machine shops; railroads; and countless other companies or concerns of similar character.

Where conductor wires come loose from their terminals in fittings because of tension or strain on conductor cords, not only do work stoppages result, but, far more seriously, fatal accidents to tool or electrical equipment operators can be occasioned thereby. More specifically, an electrical hazard of great magnitude is created where a ground wire comes loose from such a fitting terminal since the involved operator is not often aware of this and continues to work with the affected tool or appliance. As those familiar with power tools are aware, there are certain conditions under which an ungrounded tool or appliance can be extremely dangerous. In addition to being dangerous, conductor fittings with disconnected wires must be repaired, or replaced, at added expense (over and above the work stoppage expenses resulting from such defective parts) to tool owners. Even where the fittings are of a type which can be easily repaired, the consequent repair expenses are appreciable, and where they are of the molded type, seen more and more frequently in commercial usage today, they must be replaced with relatively expensive replacement type fittings when internally defective, thus running the costs of keeping the fittings in repair still higher.

SUMMARY OF THE INVENTION

The strain relief device of this invention is made up of several structurally simple and inexpensive parts which can be easily installed for use (in cooperating relationship) on, and as easily removed from, a conductor cord without the need of any tool, or tools, and which functions to relieve a portion of the cord, typically adjacent a connector fitting, of the tensions or strains to which the cord is normally subjected in use. Briefly, the device comprises a pair of semicylindrical clamp members which are made to fit snugly around the conductor cord and have slanting, beaded side edges which come into engagement when the members are slid together along the cord to hold them in sleeve-like encirclement of the latter. Additionally, the device has an anchoring cable with accessory attachments which permit it to be made fast at one end, as by attachment to an immovable object, and so associated with one of the clamp members at the other end as to urge the latter into engagement with the remaining clamp member under the pulling influence of the ordinary strains to which the cord is subjected in use. The various parts of the strain relief device are designed to fit together for use in such a way that stress exerted thereon by a conductor cord serves to pull its clamp members into tighter engagement against the resistance of its anchoring cable, thereby making the device self-tightening under increased cord tensions and insuring against loosening, or release, of the grip of the clamp members on the cord as a result of sudden jerks, or other strain-generating circumstances, to which the cord might be subjected in use.

My strain relief device, in a preferred form, has a snap hook fastener attached to that end of its anchoring cable which is made fast when the device is installed for use, one way of employing the hook being to fasten it to an eye bolt anchored to a fuse or breaker box for snubbing the end of a conductor cord plugged into the box against pulling strain in the cord, thereby relieving the resulting plug connection of such strain. In addition to providing a means of relieving strain on connections between conductor cords and breaker boxes, or the like, the strain relief device of this invention can be used in pairs to straddle connections between conductor cords and provide strain bridges across the connections in a manner hereinafter explained, to protect the latter from the bad effects of any strains or tensions in the cords. Where a pair of the devices are so employed, the anchoring ends of their anchor cables are joined together so that the cables form a continuous strain path past the protected connection, the clamp members of each of the pair of strain relief devices being, of course, installed on a separate one of the conductor cords far enough from said connection to leave slack in the cord between the clamps and the connection and free that part of the cord, and the connection, from all strains in the balance of the cord.

As will thus be seen, the strain relief devices of this invention, by routing strains and tensions in conductor cords past their points of connection with other cords, or the like, serve to protect all concerned from the above-mentioned shock hazard, work stoppage and fitting repair consequences of exposure of cord connections and fittings to such strains.

It is therefore a principal object of my invention to provide strain relief means for preserving conductor cord connections and fittings from the deleterious effects of pulling strains, or tension, normally found in such cords in use.

It is another object of the invention to provide such means in simple and inexpensive form which can be easily installed for use, and removed, by hand, without the need of any tool, or tools.

It is yet another object of the invention to provide such means which is inherently self-tightening under the influence of increased conductor cord strain to minimize any danger of its loosening or failure during continuous periods of usage.

It is still another object of the invention to provide such means which can be employed on conductor cords of any size and for temporary or permanent installation purposes.

It is another object of the invention to provide such means so designed as to fit a conductor cord without danger of damaging it in any way.

Other objects, features and advantages of the invention will become apparent in the light of disclosures to follow herein.

BRIEF DESCRIPTION OF THE DRAWING

FIGURE 1 is a fragmentary perspective view of a conductor cord plugged into a breaker box with a preferred embodiment of the strain relief device of this invention installed on the cord and snubbing it to an anchor point on the face of the breaker box to relieve the strain on the fitting connection between the cord and box.

FIGURE 2 is a fragmentary elevation of two conductor cords in coupled relationship with a pair of strain relief devices of the type shown in FIGURE 1 connected across the cord fittings to relieve the strain on the fitting connection.

FIGURE 3 is an enlarged fragmentary side elevation of a conductor cord and a strain relief device similar to that shown in FIGURE 1, a pair of clamping members constituting principal parts of the device being shown in spaced apart relationship along the conductor cord to illustrate the manner in which they are fitted thereagainst for installation purposes.

FIGURE 4 is a view similar to the FIGURE 3 view but showing the two clamp members of the strain relief device engaged to illustrate the way the cord is gripped by the device when the latter is installed thereon.

FIGURE 5 is an enlarged cross section of the conductor cord and engaged clamp members, taken along line 5—5 of FIGURE 4.

FIGURE 6 is a fragmentary perspective, drawn to a slightly smaller scale than the FIGURE 4 view, of a modification of the strain relief device shown in the latter figure in installed position on a conductor cord.

DESCRIPTION OF THE PREFERRED EMBODIMENT

Considering now the drawing in greater detail, there is shown generally at 10 a preferred embodiment of a strain relief device in accordance with this invention, hereinafter referred to as strain relief device 10. Strain relief device 10 comprises two clamp members 12 and 14, hereinafter referred to, for obvious reasons, as lower clamp member 12 and upper clamp member 14, respectively. While these clamp members are designated in terms of vertical positioning, it will be apparent that their relative vertical positions could be reversed from those illustrated in the drawing, although the latter are preferred for reasons believed evident in the light of subsequent disclosures herein.

In addition to the aforesaid clamp members, strain relief device 10 includes an anchoring cable 16, consisting of a length of cable 18 (hereinafter called cable 18) having a ball 20 attached to a first end and a snap hook fastener 22 to its second end. As the drawing indicates, all parts of the strain relief device are made of metal, and the ball 20 has a receptive opening into which an end of the cable fits, the ball being shrunk or pressed on the cable, preferably, brazed or hard soldered in place. The snap hook fastener 22 can be fastened to the cable by any means familiar to those skilled in the art. For example, the hook fastener could be a spring harness clip of malleable iron which could, in turn, be closed around a ball, similar to ball 20, on the aforesaid second end of the cable to provide the necessary hook fastening arrangement.

Each of the clamp members 12 and 14 is of generally semicylindrical form, and each has parallel lateral edges 12a and 14b, respectively, which slope, at the same angle of incline, from left to right, as shown on FIGURE 3. The edges 12a and 14b of the clamp members are all of generally bead-like configuration, as best shown in FIGURE 5, the former (edges 12a) being formed by an outward curling of the lateral walls of clamp member 12 and the latter (edges 14b) by an inward curling of the lateral walls of clamp member 14. As will be apparent, clamp member 14 (as well, incidentally, as clamp member 12) is of relatively thin metal construction with side walls of sufficient resiliency to permit them to spring out far enough to allow their lower edges to curl inwardly in the manner depicted in FIGURE 5.

The clamp members are of properly arcuate cross sectional configurations, and properly sized, to permit them to snugly embrace a conductor cord such as shown at C, and hereinafter referred to as conductor cord, or simply conductor or cord, C, as shown in FIGURE 5. While, as the drawing illustrates, the clamp members fit conductor cord C perfectly, those members, by virtue of their flexibility, can be employed on cords of different sizes up to a certain limit, beyond which clamp members of a more suitable size can be substituted therefor, such substitution being very easily accomplished, as will appear.

Clamp members 12 and 14 are easily installed on a conductor cord, in a matter of seconds, by simply placing the lower clamp member snugly against the lower portion of the cord, and bringing the upper clamp member down on the top of the cord in mating relationship therewith and spaced slightly to the left of the lower member, when all parts are viewed as shown in FIGURE 3. Thus positioned, upper clamp member 14 is urged to the right, as indicated by the directional arrow on FIGURE 3, until the upturned outer rims of its beaded edges 14b slide into the channels formed underneath the beaded edges 12a of lower clamp member 12, at which point the downturned rims of beaded edges 12a ride into the channels defined by the beaded edges 14b of the upper clamp member, all as illustrated in FIGURE 5. The thus-interlocked edges of the two clamp members now hold those members together in sleeve-like embrace of the conductor, as best illustrated in FIGURE 4. The upper clamp member 14 is pulled to its position of interlock with the lower clamp member by means of the anchoring cable 16, which is placed in position for this purpose in a manner as hereinafter explained.

The interlocking interfit between the beaded edges of the two clamp members when they are slid together in the above-described manner is made possible by the equiangular slopes of the edges of the members and side wall dimensions which permit the members to fit together in the manner illustrated in FIGURE 4 when they are relatively positioned, one to the other, as there shown. As will be apparent, further urging of the upper slide member 14 to the right of its FIGURE 4 position, relative to the lower slide member, results in a tightening of the interlock between the two slide members, thus rendering the strain relief device self-tightening under increased strain on the conductor cord, which strain would manifest itself in a pulling of the cord to the left, as seen in FIGURE 4, thereby causing an equal, and oppositely directed, force to exert itself on the coupled clamp members through cable 16.

The upper clamp member 14 has a protruding rib running longitudinally thereof, intermediate its lateral edges, defining a tunnel-like passageway 14a sized to snugly receive the cable 18, as best shown in FIGURE 5. The protruding rib does not extend for the full length of clamp member 14, but terminates a distance roughly equal to the diameter of ball 20 from its left end, as seen in FIGURES 3 and 4. The top, or ridge portion of clamp member 14 between the left end of the rib defining passageway 14a and the left end of the clamp member has a slit continuous with the bottom opening of passageway 14a and of substantially the same width as that opening, the purpose for which will shortly be explained. The bottom of lower clamp member 12 has a plurality of slots 12b disposed parallelly and transversely thereof, as shown in FIGURES 3 and 4, to permit better purchase of the conductor by that member when it is engaged with the upper clamp member to insure against slippage of the strain relief device when installed on conductor C for purposes of this invention. The slots 12b are not critically necessary to my strain relief device, however, and the lower clamp member can be made without them, if desired, within the scope of this invention.

The preferred way of fastening strain relief device 10 to a conductor such as conductor C is to first position ball 20 of anchoring cable 16 on the top of upper clamp member 14 in roughly the position occupied by that ball in FIGURE 3, while holding the clamp member free of the conductor cord and threading cable 18 into the above-mentioned slot in the top of the member between the left end of the protruding rib defining passageway 14a and the left end of the member itself, so that the cable hangs down. Next, the cable is swung upwardly and to the right, as seen in FIGURE 3, until it occupies passageway 14a and extends to the right therefrom. This cable swinging operation is accomplished with the upper clamp member oriented substantially as shown in FIGURE 3, but held out of contact with conductor C. After the cable is swung upwardly and to the right, as described, the upper clamp member is fittted against the upper portion of conductor C, in a position substantially as shown in FIGURE 3, and then urged to the right, preferably by pulling cable 18 in that direction, until it comes into engagement with the lower clamp member, which during this time, has been held against the conductor in the position shown in FIGURE 3. When the two clamp members are thus brought into engagement they are locked in their sleeve-like embrace of the conductor referred to above and illustrated in FIGURE 4.

The above-described procedure can be followed for any installation of strain relief device 10 on a conductor cord, either for snubbing of the cord to a permanent anchor, as illustrated in FIGURE 1 (in which the anchor is an eye bolt 26 fixedly secured to a breaker box 24), or where two of the devices are installed either side of a connection between conductors to provide a strain bridge across the connection, as illustrated in FIGURE 2, only the pull direction of the anchor cable varying from that indicated in FIGURE 3 where it is necessary to install the device to pull its upper clamp member in the opposite direction, as in the case of the right hand strain device of FIGURE 2.

As will be apparent from the foregoing, and the drawing illustrates, the metal ball 20 affixed to one end of cable 18 is sufficiently larger in cross section than the cross-sectional area of passageway 14a underneath the protruding rib on upper clamp member 14 to catch on the left end of the rib, as viewed in FIGURES 3 and 4, and thereby permit rightward pull on the cable to urge clamp member 14 in that direction, for engagement with lower clamp member 12 as taught herein, as well as to hold the clamp members in position around conductor cord C against the pull of the latter on the strain relief device when the device is installed for service on the cord. The lower clamp member 12 is flared part way around its arcuate end edges, as shown at 12c and 12d, respectively, to minimize the possibility of those edges scarring or cutting into a conductor cord as that member is pulled into tight engagement with the upper clamp member during usage of the strain relief device on the cord. Here again, as in the case of slots 12b in the lower clamp member, the flares on the ends of the latter are not critically necessary to proper functioning of strain relief device 10 and can be dispensed with, if desired, within the scope of my invention.

FIGURE 6 shows an embodiment of my strain relief device similar to strain relief device 10, except that it has a finger ring 26 substituted for ball 20 on its anchoring cable, the latter being shown at 16', and its cable section as 18', on the drawing. The FIGURE 6 embodiment of the strain relief device is intended primarily for temporary, rather than permanent, snubbing use, and, consistent with this, can be easily loosened and removed from the conductor, after it has served a temporary purpose, by merely unhooking it from its anchor point, not shown, and pulling its anchoring cable in the appropriate direction, by means of finger ring 26, until its hooked end, obviously too large to pass through the cable passageway in its upper clamp member corresponding to passageway 14a of strain relief device 10, comes even with the right end of the structure defining said passageway, then jerking the finger ring sufficiently hard to loosen the two clamp members and slide them apart.

The structure, manner of operation and manner of functioning of the illustrated embodiments of my strain relief device should be clear from the foregoing description, considered conjunctively with the accompanying drawings. The proper point for installation of the clamp member of strain relief device 10 on a conductor cord is that at which the tip of snap hook fastener 22 falls at least half an inch shy of the forward face of the fitting to be protected, in order to leave slack in the cord between the fitting and clamp position, as illustrated in FIGURES 1 and 2 of the drawings, and thereby relieve that portion of the cord, and the fitting, of strain after installation of the device for service as taught herein. As will, of course, be apparent, the clamp members of the strain relief device can be installed on the cord at a distance substantially farther from the protected fitting than this, to leave whatever amount of slack might be desired for proper tool usage in any particular context.

While the strain relief device of the invention has been herein illustrated and described in what are conceived to be preferred and practical forms, it is emphasized that departures may be made therefrom within the scope of the invention. Certain of these departures have already been mentioned, and others will occur to those skilled in the art in the light of present teachings. Exemplary of the latter are noncritical variations of the features of the strain relief device components; the use of substitute materials of construction for parts of the device; the elimination of certain structural, or other, features of the device not critically essential to its proper use and functioning; the addition of useful, but noncritical, accessories to the strain relief device; etc.

Specifically illustrative of the many permissible strain relief device modifications of the above-noted types would be directional slope changes in the lateral edges of the clamp members of the strain relief device, so long as engagement of those clamp members in substantially the manner, and for the purpose, taught herein is not thereby precluded; other combinations of bead edge arrangements than those illustrated which would still permit engagement of the lateral edges of the clamp members in substantially the manner taught herein; the substitution of other fastening means for snap hook fastener 22; the substitution of other stop means for ball 20 or finger ring 26; redesign of the upper clamp member to include a rib-like protrusion running the full length thereof in lieu of its shortened counterpart on strain relief device 10; etc.

It is emphasized, in final summary, that the scope of my invention extends to all variant forms of its drawing illustrated embodiments encompassed by the language of the following claims.

What is claimed is:

1. Strain relief means for preventing pulling tension on a conductor cord fitting, comprising:

a pair of generally semicylindrical clamp members adapted to fit snugly against opposite sides of such a conductor cord and slide into engagement therearound to hold the cord in a tight, sleeve-like grip; said clamp members having mutually and slidably interengageable edges extending at an angle to their longitudinal axes whereby relative sliding in one direction causes said members to tightly grip a conductor cord therebetween; one of said members having a longitudinally extending outwardly protruding hollow rib defining a passageway; a cable extending through said passageway; an enlargement, larger than said passageway, secured to one end of said cable; and hook means secured to the other end of said cable.

2. The strain relief means of claim 1 in which said enlargement is a metallic ball and the hook means is a snap hook fastener.

3. The strain relief means of claim 1 in which the clamp member other member has a plurality of penetrating slots running partway therearound in the transverse direction to provide improved purchase of a conductor cord thereby when the strain relief means is installed for use on said cord.

4. The strain relief means of claim 1 in which said enlargement is a finger ring and the hook means is a snap hook fastener, said finger ring serving not only as a stop means to prevent passage of said first end of said length of cable through the hollow passageway, but, additionally, as a means to permit hand pulling of said anchoring means in the proper direction to separate the clamp members when it is desired to remove said strain relief means from an installed position on a conductor cord.

5. The strain relief means of claim 1 in which said rib terminates short of one end of said one of said clamp members and in which that clamp member has a slot in that part of its length extending beyond said protruding rib which is continuous with, and substantially the same width as, the mouth of said hollow passageway.

References Cited

UNITED STATES PATENTS

| | | | |
|---|---|---|---|
| 1,555,289 | 9/1925 | Jackson | 287—20.5 X |
| 1,948,845 | 2/1934 | De Right | 24—126 |
| 2,068,368 | 1/1937 | Bouvier et al. | 287—77 |
| 2,220,203 | 11/1940 | Branin | 24—126 |
| 2,303,108 | 11/1942 | Blackburn | 24—126 |
| 2,424,542 | 7/1947 | Adams | 24—126 |
| 2,781,212 | 2/1957 | Jugle | 24—126 X |
| 2,913,791 | 11/1959 | Martin | 24—126 |
| 2,966,541 | 12/1960 | Gale | 174—79 X |

FOREIGN PATENTS 882,398  11/1961  Great Britain.

LEWIS H. MYERS, Primary Examiner

A. T. GRIMLEY, Assistant Examiner

U.S. Cl. X.R.

24—126, 136; 339—103, 106